Oct. 25, 1955      J. C. W. BEADLE      2,721,716
COLLAPSIBLE PARACHUTE

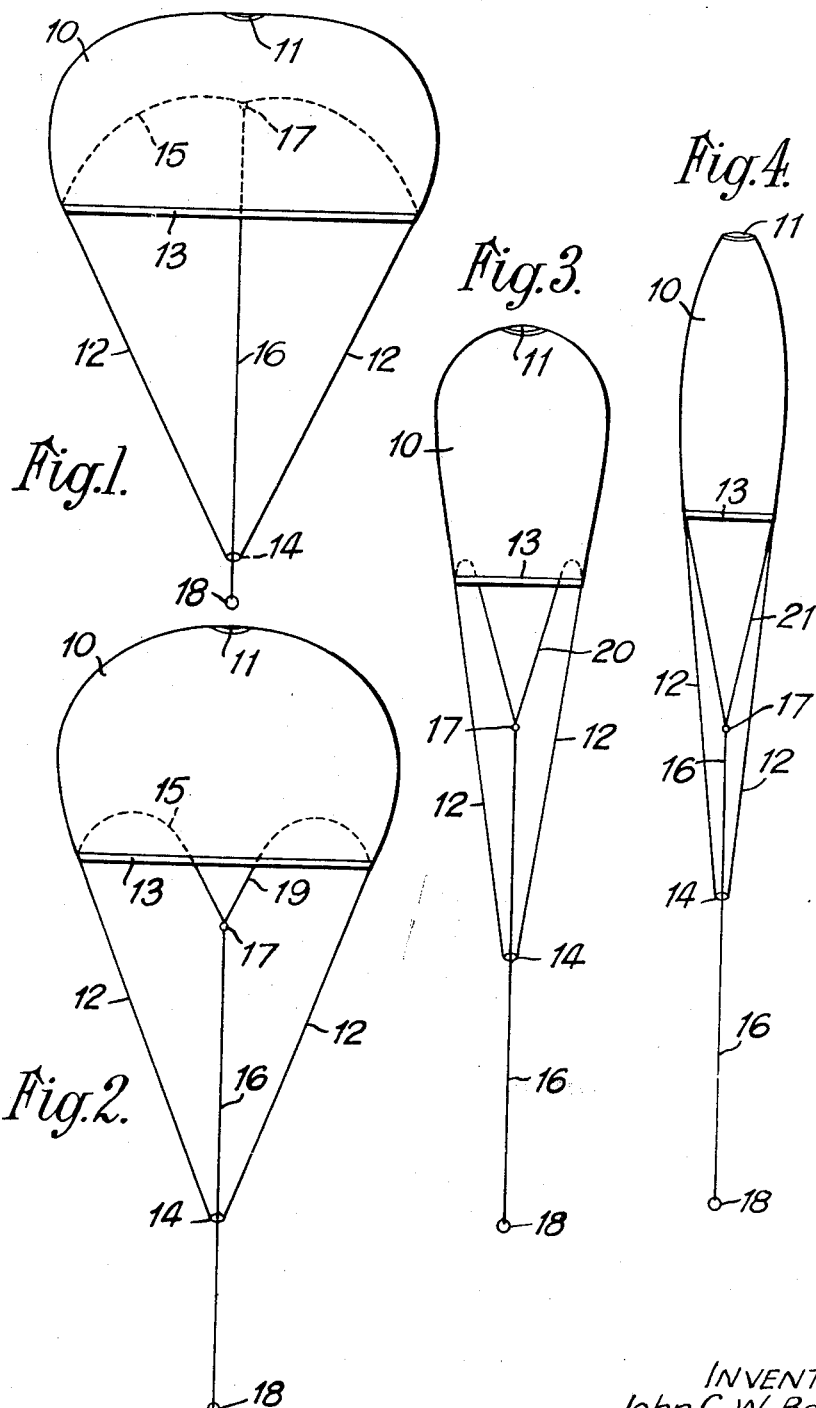

Filed March 23, 1953      2 Sheets—Sheet 2

INVENTOR
John C. W. Beadle
By Shoemaker & Mattare
ATTORNEYS

United States Patent Office 2,721,716
Patented Oct. 25, 1955

2,721,716

COLLAPSIBLE PARACHUTE

John Charles William Beadle, Woking, England

Application March 23, 1953, Serial No. 344,087

Claims priority, application Great Britain March 31, 1952

4 Claims. (Cl. 244—142)

This invention has reference to parachutes, and is applicable to parachutes for many purposes, in particular for braking of high-speed aircraft and missiles, for controlled dropping of stores from aircraft, and for man-dropping from high-altitude high-speed aircraft, when conditions may call for conscious regulation of the speed at different altitudes, this being obtained by controlled inflation or deflation of the main canopy.

Its main object is to provide a parachute, for example one intended for use as a brake for retarding aircraft, with a device for closing and reopening the parachute whilst it is in use. Thus by means of the device, a parachute can be made ineffective either temporarily or otherwise, after it has been deployed.

Other objects of the invention are to provide a parachute with means whereby it can be partially collapsed when required. Another object is to enable such collapsed parachute to be automatically again deployed. A further object is to control the degree of collapse of the parachute whilst enabling it to become deployed again when so desired.

The invention is hereinafter described with reference to the accompanying drawings, in which:

Fig. 1 represents diagrammatically a parachute having its main canopy fitted internally with a false canopy controlled by a single line attached at its center.

Figs. 2 and 3 are similar views showing the false canopy at two stages of its eversion and withdrawal from the main canopy and the latter gradually contracting at its periphery.

Fig. 4 shows the false canopy everted and pulled out to the full extent, in an approximately conical shape, and the main canopy collapsed.

Figure 5:
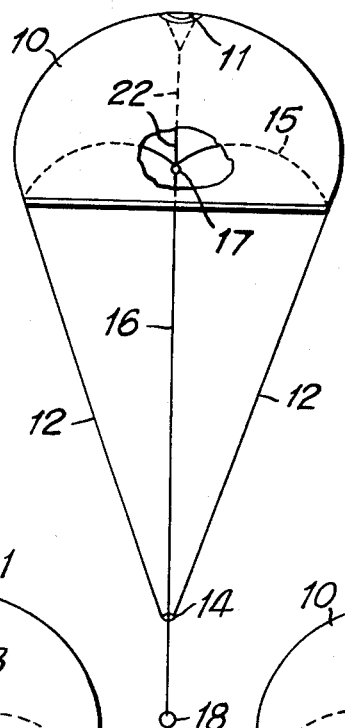
Figs. 5, 6 and 7 are views similar to Fig. 1, showing modifications of the invention.

Referring to Figs. 1 to 4, the parachute comprises a main canopy 10, shown as having an air vent 11 in the crown, and shroud lines 12 secured to its periphery 13; for simplicity of the drawing, only two opposite shroud lines are shown. The shroud lines extend to a ring or shackle 14, to which a load may be attached, for example the aviator descending by parachute or stores dropping from an aircraft.

Inside the main canopy, there is fitted a false canopy 15, made for example of coarse or fine mesh netting, ribbons, tapes or like flexible material, sufficiently permeable to allow the air to inflate the main canopy under normal conditions, as seen in Fig. 1; the false canopy is attached at its edges to the main canopy around or close to the periphery 13 of the latter. This false canopy 15 is provided with a control line 16 secured to its crown at 17, or to its vent-hem by means of branches from the upper end of the line; the lower end of the control line is brought down to the load ring 14, and extended for example to within reach of the descending aviator, who may operate it by means of an eye or ring 18. The first effect of pulling down the control line will be to draw down the center of the false canopy, for example as shown in Fig. 2, giving its central area an approximately conical shape, as indicated at 19; at the same time, the periphery 13 of the main canopy will be somewhat contracted and the effective area of the parachute reduced. Further pulling of the control line 16 will draw down more of the false canopy, as indicated at 20 in Fig. 3, with further contraction of the periphery 13. Finally, with the line 16 pulled down to the full extent, as shown in Fig. 4, the false canopy will be completely everted and withdrawn from the main canopy in substantially conical shape, as indicated at 21, the periphery 13 of the main canopy being fully contracted.

It will be noted that when the false canopy is withdrawn from its normal position, first its crown (Fig. 2), then the surrounding zone (Fig. 3) and finally the whole canopy (Fig. 4) assume the conical shape, in which the mesh cords, ribbons, tapes or the like gradually close together, rendering these areas substantially impenetrable to the air, which is thus deflected outwardly; the main canopy 10 therefore collapses due to the pull of the control line 16 exerted through the false canopy and also to the fact that the false canopy as it is pulled down, deflects the air-stream outside the main canopy.

Partial release of the control line 16 will allow the false canopy 15 to resume its curved shape near the periphery 13 of the main canopy, as shown in Fig. 3, flow of air through the partly opened mesh cords, ribbons or the like passing into the main canopy and re-inflating it to some extent. Further release of the line 16, allowing more of the false canopy to resume its curved shape, will reduce the impenetrable surface and increase the flow of air into the main canopy, thereby further developing it as seen in Fig. 2. Finally, the complete release of the control line will allow the false canopy 15 to resume its normal condition, with free flow of air into the main canopy 10, the latter being inflated to its normal shape, as seen in Fig. 1.

In some cases, as illustrated in Fig. 5, the false canopy 15 may be provided with one or more elastic cords 22 secured to the crown of the main canopy, these cords being stretched when the false canopy 15 is brought to the everted position and then acting to pull upon the control line 16 so as to assist in returning the false canopy to its normal position inside the main canopy.

Figure 6:
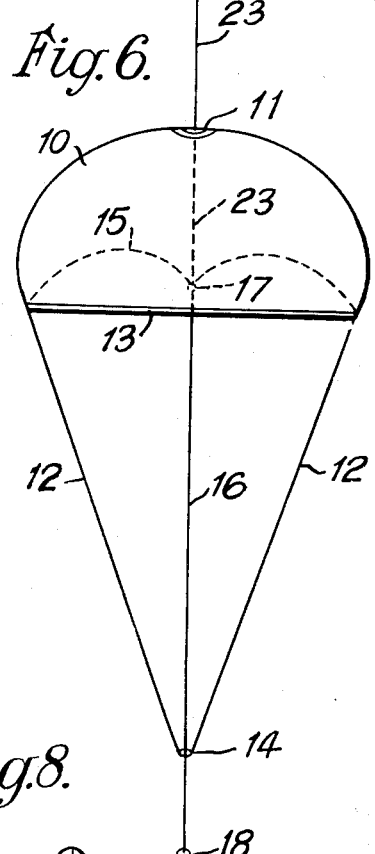
Figure 7:
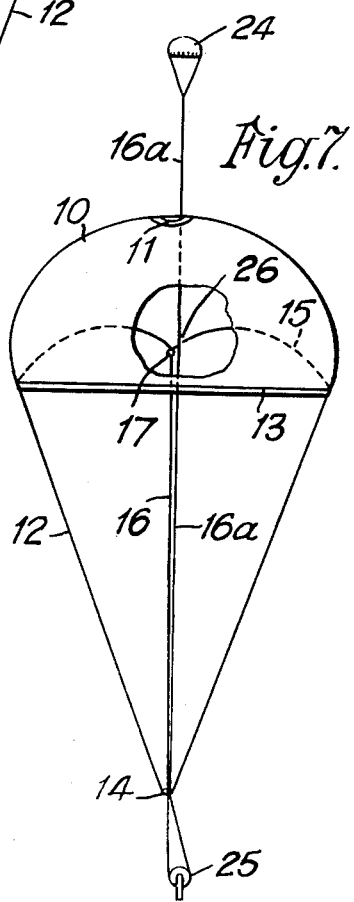

In another arrangement, as illustrated in Fig. 6, the false canopy 15 is provided not only with a control line 16 secured to its crown, but also with a line 23 passing through the air vent 11 of the main canopy, this line 23 being connected to an auxiliary parachute 24 of small size; the pull of this line 23 when the auxiliary parachute becomes inflated assists the re-entrance of the false canopy 15 into the main canopy 10 on release of the control line 16.

In a further modification, the control line 16 is passed around a pulley 25 connected to the load, and returned through the ring 14, passing up as indicated at 16a through an air vent or aperture 26 at the center of the false canopy 15 and through the air vent 11 in the crown of the main canopy 10, its end being secured to an auxiliary parachute 24. Thus the pull of the line 16 when the auxiliary parachute becomes inflated will cause the eversion of the false canopy 15, bringing it to the approximately conical shape shown in Figs. 2, 3 or 4; when the drag of the auxiliary parachute falls off, as the speed of the parachute is reduced, the false canopy will be allowed to enter the main canopy and the latter will re-open to a corresponding extent. The result will be that the main canopy 10 will open or close automatically to give a limiting speed determined by the relative size of the auxiliary parachute 24.

It will be understood that the control line 16 may be pulled down or released either quickly or slowly, according as it may be desired to maintain the parachute in the partially collapsed condition shown in Figs. 2 and 3, in stages between full inflation and complete collapse; in the condition shown in Fig. 2, with the false canopy 15 pulled out partly, and the main canopy 10 only slightly closed, the parachute becomes very stable in the air, so that the control line 16 may be used to secure stability during a descent. The operation can be effected manually, as by a descending aviator, or by the aid of a winch fitted upon a descending load and driven by any convenient source of power, at constant or at varying speed.

Figure 8:
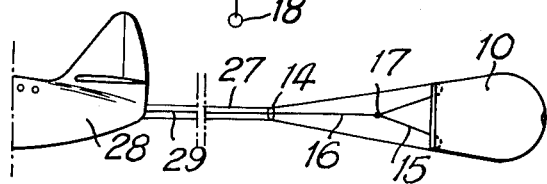
Fig. 8 is a diagram showing this parachute employed as a brake for retarding an aircraft in flight.

Referring to Fig. 8, which illustrates the use of the parachute as a brake for retarding an aircraft, the ring 14 at the end of the shroud lines 12 is connected by a drag line 27 to the tail 28 of the aircraft, while the control line 16 secured to the crown of the false canopy 15 inside the main canopy of the parachute is extended at 29 to the aircraft for operation by one of the occupants, either manually or by the aid of a winch. By varying the pull upon the control line, it will therefore be possible to regulate the degree of eversion of the false canopy 15, and thereby to control the retarding effect of the parachute.

What I claim is:

1. A parachute comprising a main canopy, a false canopy fitted inside said main canopy and attached at its edges to the periphery of said main canopy, load-supporting lines attached to the periphery of said main canopy, means including a control line for everting said false canopy and drawing it out from inside said main canopy to an approximately conical shape, and means for assisting a return of said false canopy to its normal position inside said main canopy.

2. A parachute comprising a main canopy, a false canopy fitted inside said main canopy and attached at its edges to the periphery of said main canopy, load-supporting lines attached to the periphery of said main canopy, means including a control line for everting said false canopy and drawing it out from inside said main canopy to an approximately conical shape, and elastic cords connecting said false canopy to the crown of said main canopy for assisting a return of said false canopy to its normal position inside said main canopy.

3. A parachute comprising a main canopy, a false canopy fitted inside said main canopy and attached at its edges to the periphery of said main canopy, load-supporting lines attached to the periphery of said main canopy, means for everting said false canopy and drawing it out from inside said main canopy to an approximately conical shape, said everting means including a control line attached at one end to the crown of said false canopy, a pulley connected to at least one of said load-supporting lines, said control line being passed around said pulley, and an auxiliary parachute attached to the other end of said control line.

4. A parachute comprising a main canopy, a false canopy fitted inside said main canopy and attached at its edges to the periphery of said main canopy, load-supporting lines attached to the periphery of said main canopy, means for everting said false canopy and drawing it out from inside said main canopy to an approximately conical shape, said everting means including a control line attached at one end to the crown of said false canopy, a pulley connected to at least one of said load-supporting lines, said control line being passed around said pulley and through the crowns of said canopies, and an auxiliary parachute attached to the other end of said control line.

References Cited in the file of this patent

UNITED STATES PATENTS

| | | |
|---|---|---|
| 2,120,177 | Hart | June 7, 1938 |
| 2,308,797 | Nasca | Jan. 9, 1943 |
| 2,511,601 | Smith | June 13, 1950 |
| 2,610,008 | Smith | Sept. 9, 1952 |

FOREIGN PATENTS

| | | |
|---|---|---|
| 141,741 | Switzerland | Oct. 16, 1930 |
| 281,881 | Great Britain | Dec. 15, 1927 |
| 402,673 | Italy | Mar. 18, 1943 |
| 538,414 | France | Mar. 18, 1922 |